June 18, 1968
T. A. CRAWFORD
3,388,419
CASTER LOCKING MEANS
Filed Sept. 27, 1965
3 Sheets-Sheet 1
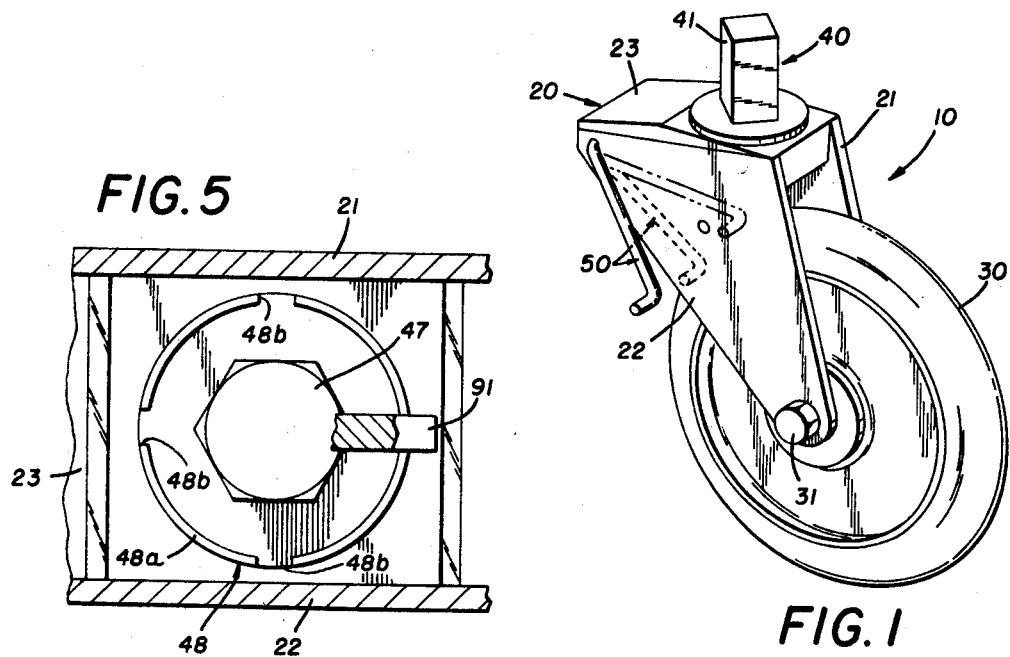
FIG. 5
FIG. 1
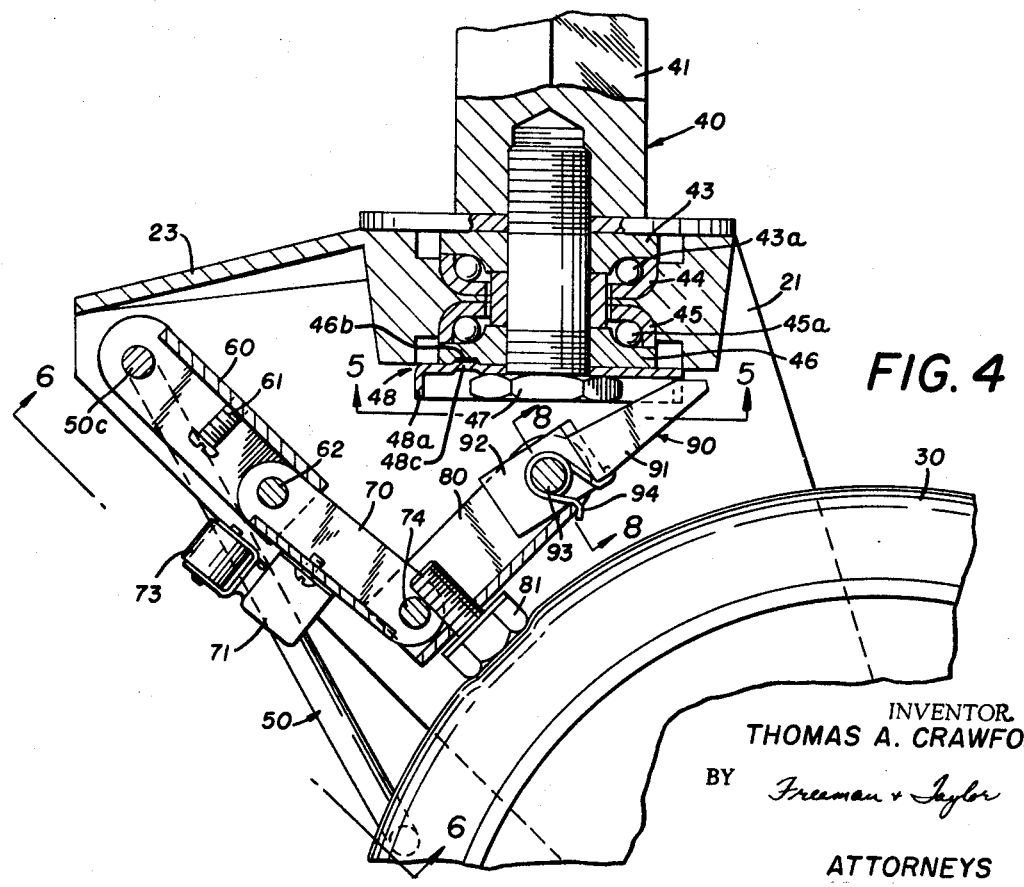
FIG. 4
INVENTOR.
THOMAS A. CRAWFORD
BY Freeman & Taylor
ATTORNEYS June 18, 1968

T. A. CRAWFORD 3,388,419

CASTER LOCKING MEANS

Filed Sept. 27, 1965

INVENTOR.
THOMAS A. CRAWFORD
BY Freeman + Taylor
ATTORNEYS

June 18, 1968 T. A. CRAWFORD 3,388,419
CASTER LOCKING MEANS

Filed Sept. 27, 1965 3 Sheets-Sheet 3

INVENTOR.
THOMAS A. CRAWFORD
BY Freeman & Taylor
ATTORNEYS 3,388,419
CASTER LOCKING MEANS
Thomas A. Crawford, 606 Nome Ave.,
Akron, Ohio 44320
Filed Sept. 27, 1965, Ser. No. 490,214
6 Claims. (Cl. 16—35)

ABSTRACT OF THE DISCLOSURE

A locking assembly for a caster including a U-shaped handle carried by the caster yoke, and connected to a series of link arms also carried by the yoke. The link arms carrying brake members which are movable into and out of locking engagement with the pintle of the caster, the wheel or both to provide a three position locking assembly.

---

This invention relates to the art of locking assemblies for casters and in particular relates to a three-position device for selectively, either permitting the pintle of a caster to swivel and the wheel to rotate, or locking the pintle of the caster against swiveling movement while permitting the wheel to rotate, or locking the pintle against swiveling and the wheel against rotation simultaneously.

It has been generally known in the prior art that locking means can be provided on casters for preventing swiveling, swiveling and rotation of the wheel or rotation of the wheel alone. However, the prior art means for achieving such locking have had certain disadvantages.

Generally, casters consist of a yoke member which has a pair of parallel legs connected by a base to thus present an inverted U-shaped configuration. A pintle is pivotally secured to the base and a wheel is rotatably journalled between the legs, with the point of connection of the wheel to the legs being offset slightly from the pintle to facilitate swiveling of the caster.

The locking means known to the prior art are generally carried by the yoke and the levers or handles that are utilized to move the locking means to the desired positions are generally carried by the yoke and project from portions thereof opposite the wheel. Accordingly, in operation, when the wheel of the caster is swiveled under the supported member, access to the operating means is curtailed.

Additionally, the prior art structures have basically utilized either tension means, such as springs, to actuate the locking device or camming means and in both cases such devices are subject to wear after periods of use with corresponding diminishment of their effectiveness.

Also, due to the above noted construction of the locking means, a relatively high degree of force has been required to operate the same in moving the locking means between various positions.

It has been found that by providing a U-shaped operating handle, carried by the yoke of the caster and projecting from both sides thereof, that improved accessibility is provided regardless of the position of the caster with regard to the supported surface.

It has also been found that by providing a series of link arms pivotally connected in a series, to the operating lever, to the yoke or support member and to each other, that movement through a series of preselected positions can be achieved with a minimum of force and with improved efficiency.

It has further been found that by providing braking means on two of the link arms that due to arranging the arms in series a three position braking device can be achieved. Thus the caster can either be completely unlocked so that the caster may swivel about its pintle and the wheel can rotate or swiveling of the caster can be prevented while permitting the wheel to rotate or both swiveling and rotation can be prevented simultaneously.

Accordingly, production of an improved caster locking device having the aforementioned characteristics becomes the principal object of this invention with other objects thereof becoming more apparent upon a reading of the following brief specification interpreted in the light of the drawings.

Of the drawings:

FIGURE 1 is a perspective view of the improved caster.

FIGURE 4 is a side elevation partially broken away and in section showing the caster locked against both swiveling and wheel rotation.

FIGURE 5 is a sectional view taken on the lines 5—5 of FIGURE 4.

Figure 3:
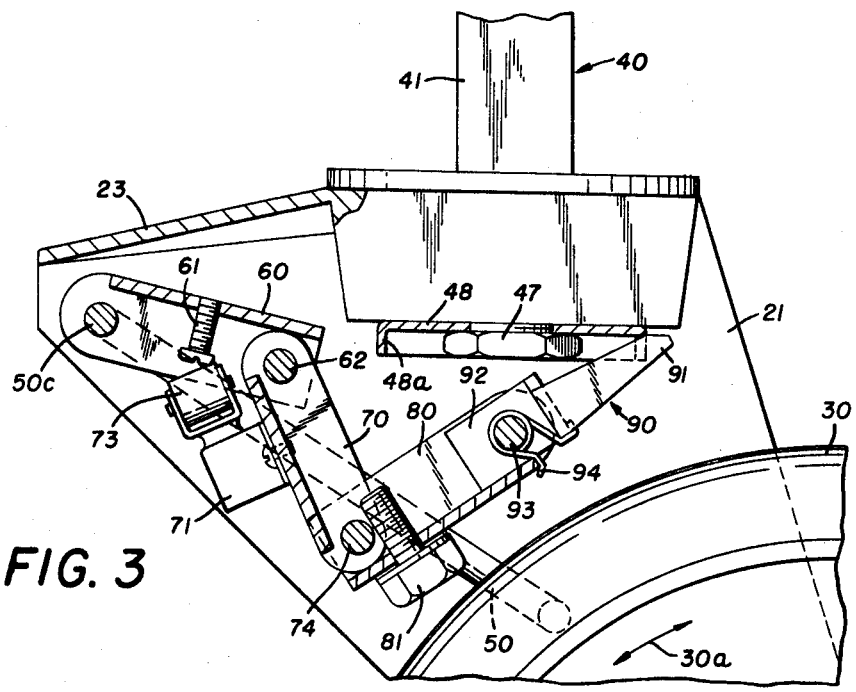
FIGURE 3 is a side elevation of the improved caster partially broken away and in section showing the caster locked against swiveling only.

Considering first then a general description of the caster itself and with reference to FIGURE 1, it will be noted that the caster, generally indicated by the numeral 10, has as its principal components a bifurcated support or yoke member 20, a wheel 30 rotatably journalled between the legs 21, 22 of yoke member 20 as at 31, a swivel mechanism 40 carried on the base of the yoke and an operating lever 50 that is movable between the full, dotted and chain dotted positions of FIGURE 1 as will be described more fully below.

Turning next then to FIGURE 4 for a detailed examination of the yoke member 20, it will be seen that the same includes parallel leg members 21 and 22 and a connecting base member 23 so as to be generally U-shaped in configuration. Legs 21 and 22 are basically triangular in planar configuration and project beyond the forward edge of base 23 with wheel 30 being rotatably attached thereto as at 31. As noted above, the base 23 of the yoke 20 carries the swivel mechanism 40 which will now be described more fully.

Essentially, the swivel mechanism 40 includes a pintle 41 projecting from the top surface of the base 23. This pintle is connected at one end to the support member 20 by two pairs of races 43, 44 and 45, 46 which carry conventional ball bearings 43a, 45a and which permit swiveling of the caster relatively of pintle 41. The remaining end of pintle 41 is secured to the leg of the supported structure (not shown) in conventional fashion.

Interconnecting the races 43, 44, 45, 46 and the pintle 41 is an assembly bolt 47 as clearly shown in FIGURE 4. This bolt is threaded into the race members and the pintle so as to move in unison with the pintle.

Interposed between the head of bolt 47 and the bottom race member 46 is a locking plate 48 which is also secured by the bolt for swiveling in unison with pintle 41. This movement is achieved by interconnection of projection 48c of the plate with depression 46c of race 46 and frictional contact between the head of bolt 47 in the form of the invention shown although other means could also be used.

This locking plate 48 is provided with a depending peripheral flange 48a which has a series of notches 48b, 48b cut into its peripheral edge for cooperation with the locking mechanism that will now be described below (FIGURE 5).

Figure 6:
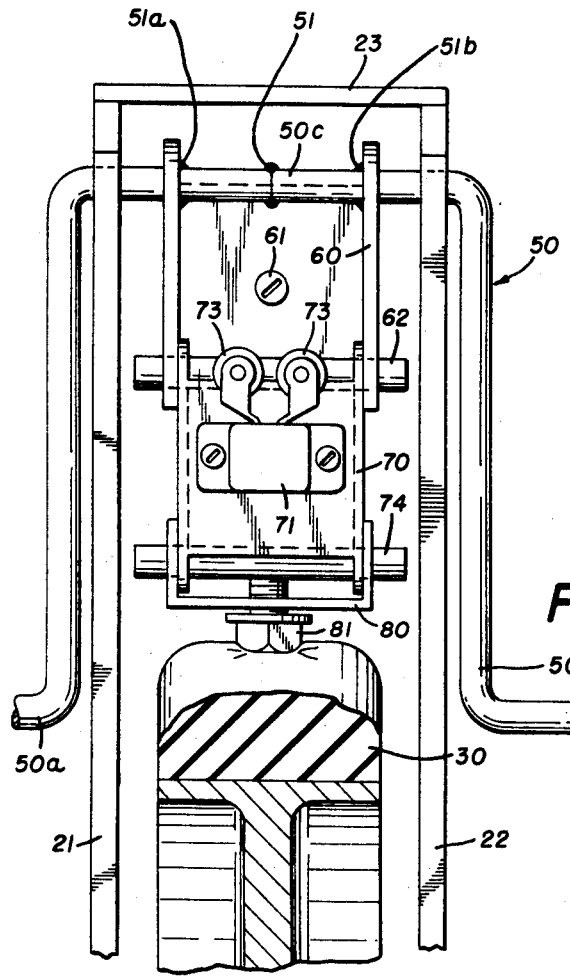
FIGURE 6 is a view taken on the lines 6—6 of FIGURE 4.

Turning next then to the locking mechanism in general, it should first be noted that the operating lever 50 is basically U-shaped and is formed from identical rods welded together at 51 so as to form a pair of parallel legs 50a and 50b interconnected by a base member 50c (FIGURE 6). This operating lever is journalled between the leg members 21 and 22 of support 20 so that the base 50c is disposed between the legs 21 and 22 while the legs 50a and 50b of the operating lever are disposed on either side of the support member 20 for improved accessibility. By so arranging the operating lever the linkage which comprises the actual braking structure can be easily operated regardless of how the caster itself is turned with regard to the supported member.

Figure 2:
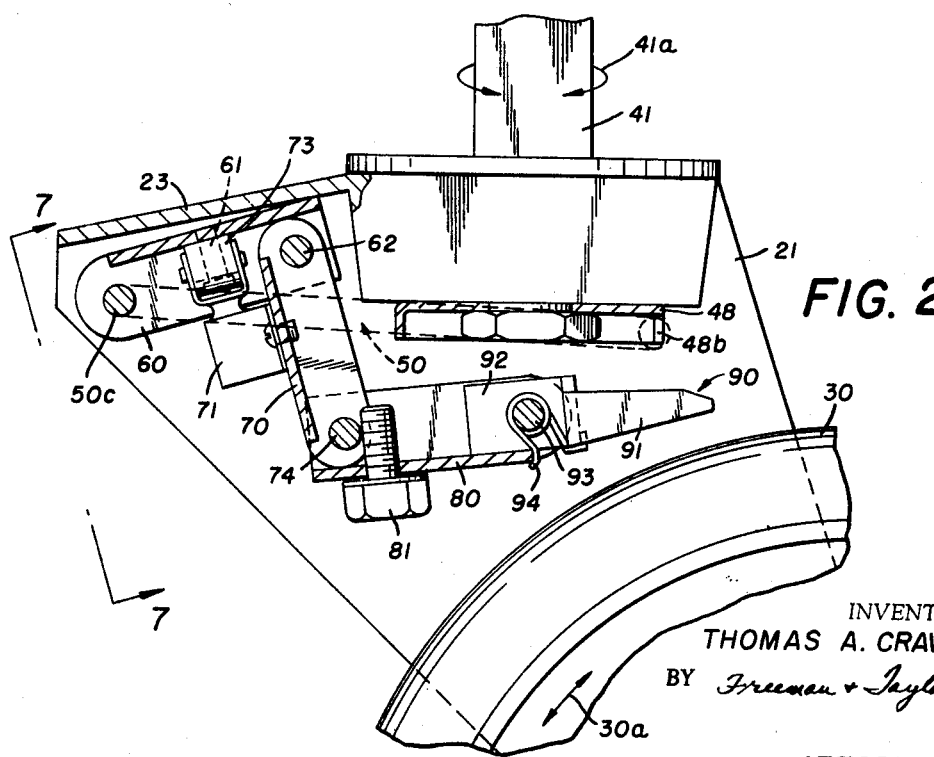
FIGURE 2 is a side elevation of the improved caster partially broken away and in section and showing the caster in position to both swivel and rotate.

Considering next then the linkage which cooperates with locking plate 48 and wheel 30 for locking purposes, attention is called to FIGURES 2 through 4 wherein this structure is shown in detail.

The braking linkage basically consists of three elongate link arms 60, 70 and 80 pivotally connected to each other and to support member 20 as will now be described.

First link arm 60 has one end thereof secured to the base 50c of operating handle 50 which, being U-shaped, has its base pivotally received between legs 21 and 22 of the support member 20. Thus, and due to the fact that handle 50 is spot welded to link arm 60 at 51a and 51b, movement of control handle 50 about the axis formed by its base 50c will result in pivotal movement of link arm 60 in unison therewith.

Connected to the opposed end of link arm 60, by pin 62, is second link arm 70. Pin 62 is fixed to the outboard arm, in this case arm 70, while being loosely journalled within appropriate apertures in link arm 60 to permit pivotal movement between arms 60 and 70 as will be described. Also the arm 70 is similar in configuration to the first link arm 60 and additionally carries stop means 71 on one face thereof for purposes to be described more fully below.

Pivoted to the opposed end of link arm 70, by pin 74 is the third link arm 80 with these arms being movable relatively of each other about the pin 74. This arm 80 carries braking means 81 on one face thereof and it should be noted here that braking means 81 is adjustable by virtue of its threaded connection with link arm 80. Thus greater braking pressure can be achieved by merely unscrewing braking means 81 so that the same projects a greater distance from the face of link arm 80.

Figure 8:
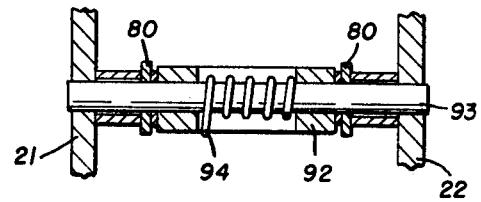
FIGURE 8 is a sectional view taken on the lines 8—8 of FIGURE 4.
Figure 7:
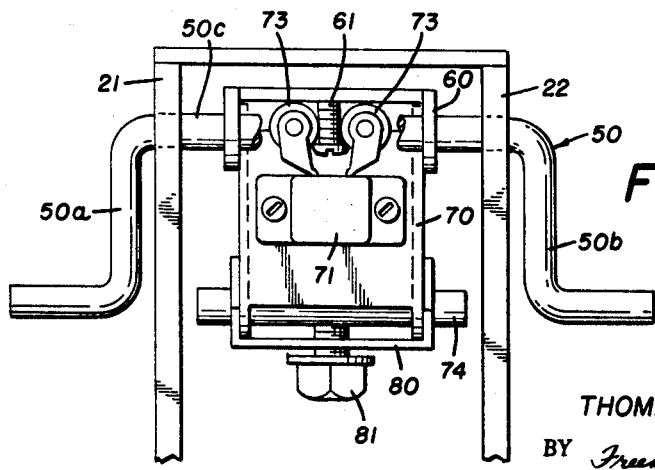
FIGURE 7 is a view taken on the lines 7—7 of FIGURE 2.

The opposed end of link arm 80 is pivotally connected between legs 21 and 22 of the yoke 20 by pin 93 which has one end thereof secured to at least one leg of yoke 20 while being freely journalled within link arm 80 and brake arm 90. Also pivoted between the legs 21 and 22 at 93 is a braking arm 90 which has a main body portion 92 and a projecting tongue portion 91 with arm 90 being normally urged into coextensive relation to the link arm 80 by spring 94 which is wrapped about pin 93 (see FIGURE 8).

With regard to pins 62, 74 and 93 it should be understood that the same can be simple pins in which case pin 62 would be spot welded to at least one side of arm 70 and pin 92 would be spot welded to at least one leg of yoke 20. Alternatively, common "roll" or "spring" pins such as those manufactured by the Elastic Stop Nut Company could be employed with one end of pins 62 and 93 being wedged into undersized holes in arm 70 and yoke 20. However, any conventional means which will insure that the pins stay in place while permitting the necessary movement between the link arms will also suffice.

In operation then it will be seen that in FIGURE 2 the operating lever 50 has been moved to its full upward position and is nearly parallel to the ground. At this point spring loaded rollers 73, 73 of stop means 71 have been forced apart so that the rollers are disposed on opposite sides of screw 61 and in this fashion the rollers will be held in place by the head of the screw. Link arms 60, 70 and 80 will also be held in the position shown in FIGURE 2 by stop means 71 and in this position the pintle 41 is free to swivel in the direction of the arrow 41a while the wheel 30 is free to rotate in the direction of the arrow 30a.

Turning next then to FIGURE 3, it will be noted that operating lever 50 has been moved in a downward direction to the position shown in dotted lines. This movement of the lever causes simultaneous movement of the link arm 60 which pivots about its point of connection to the base 50c of the operating lever. Such movement also causes link arm 70 to be forced downwardly thus releasing rollers 73, 73 of stop means 71 from engagement with screw 61. As soon as the stop means 71 is disengaged the linkage will fall to the position of FIGURE 3 by its own weight.

It will be noted in FIGURE 3 that due to the pivotal connection of the link arms to each other that link arm 80 will now also pivot about point 93 so as to bring braking arm 90 and the tongue 91 thereof into locking engagement with one of the notches 48b, 48b of locking plate 48. This not only locks plate 48 and pintle 41 against movement but also holds the linkage in this position.

At this point the pintle 41 will be prevented from swiveling but the wheel 30 will still be free to rotate in the direction of arrow 30a.

Turning next then to FIGURE 4, it will be noted that operating lever 50 has been moved to its final downward position. Such movement causes corresponding movement in link arms 60, 70 and 80.

In the position shown in FIGURE 4 it will be noted that link arm 80 has been further pivoted about rod 93, however, and due to the fact that spring 94 normally urges braking arm 90 upwardly the tongue 91 thereof will still be in engagement with locking plate 48.

Also at this point arms 60 and 70 are nearly coextensive although their point of interconnection 62 is slightly offset and braking means 81 has been forced into engagement with wheel 30. In this fashion pressure is applied radially of the tire for positive stopping action. Offsetting point 62 serves to lock the entire linkage into an L-shaped configuration and prevent buckling between arms 60 and 70.

At this point swiveling of the pintle 41 will be prohibited while rotation of the wheel 30 will also be prohibited and the entire assembly will be securely locked.

When it is desired to move the supported structure, the steps above outlined need merely be reversed to first unlock the wheel and then unlock the pintle so that the caster is free to move as desired.

It will be seen how, by provision of a series of link arms pivotally connected to the opposed legs of a yoke member and to each other, there has been provided a locking means for a caster which permits three position selective locking. Thus, the caster assembly can be locked against both rotation of the wheel and swiveling of the caster (FIGURE 4); against swiveling only (FIGURE 3) or left free to both swivel and rotate (FIGURE 2).

It will also be seen how by providing a U-shaped operating lever that is accessible from both sides of the support member that accessibility has been improved so that the locking mechanism can be actuated regardless of the position of the casters with regard to the supported surface.

Also braking pressure will be delivered radially of the wheel 30 for positive stopping action. Similarly, tongue 91 will interlock with notches 48b, 48b for positive locking action against swiveling.

It should be noted that arms 50a and 50b of handle 50 are relatively long and their length, together with the particular construction of the linkage permits the locking device to be moved from position to position with relative ease.

In this way efficient and positive braking action can be achieved with a simplified structure.

While a full and complete description of the invention has been set forth in accordance with the dictates of the Patent Statutes, it should be understood that modifications hereof can be resorted to without departing from the spirit of the attached specification or the scope of the appended claims.

What is claimed is:

1. A caster of the character described, comprising;
   (A) a U-shaped support member;
   (B) a wheel rotatably carried between the legs of said support member;
   (C) a pintle;
   (D) bearing means interconnecting said pintle and said support member for relative movement therebetween;
   (E) locking means carried by said support member and including
      (1) a first elongate link arm having one end pivoted between the legs of said support member;
      (2) a second elongate link arm having one end pivoted to the remaining end of said first link arm;
      (3) a third elongate link arm having one end pivoted to the remaining end of said second link arm and having its remaining end pivoted between the legs of said support member;
      (4) first brake means carried by said third link arm and adapted to engage said pintle upon movement of said arms about their points of pivotal connection; and
      (5) second brake means carried by said third link arm and adapted to engage said wheel upon movement of said link arms about their points of pivotal connection with said first brake means remaining in engagement with said pintle.

2. The device of claim 1 further characterized by the fact that said second brake means are adjustably mounted on said third link arm.

3. The device of claim 1 further characterized by the presence of tension means adapted to normally urge said first brake means into coextensive relationship with said third link arm.

4. A caster of the character described comprising;
   (A) a U-shaped support member;
   (B) a wheel rotatably carried between the legs of said support member;
   (C) a pintle;
   (D) bearing means interconnecting said pintle and said support member for relative movement therebetween;
   (E) actuating means
      (1) carried by said support member
      (2) projecting from the opposed sides of said support member and
      (3) being selectively movable relatively of said support member through first, second and third positions;
   (F) first and second elongate locking means carried by said support member;
   (G) means interconnecting said actuating means and said first and second locking means;
   (H) said actuating means adapted to move said first locking means relatively of said support member into locking engagement with said pintle upon movement of said actuating means from said first to said second position;
   (I) said actuating means adapted to move said second locking means relatively of said support member into locking engagement with said wheel with the longitudinal axis of said second locking means extending substantially radially of said wheel upon movement of said actuating means from said second to said third position; and
   (J) said second locking means being adjustable along its longitudinal axis.

5. The device of claim 4 further characterized by the presence of means for retaining said first and second locking means in each of said locking position.

6. The device of claim 4 further characterized by the presence of a locking plate carried by said pintle for movement in unison therewith; said first locking means being adapted to engage said plate to prevent movement of said pintle relatively of said support member.

References Cited

UNITED STATES PATENTS

| | | | |
|---|---|---|---|
| 2,188,648 | 1/1940 | Bouvier et al. | 16—35 |
| 2,695,683 | 11/1954 | Forbes | 16—35 |
| 2,707,794 | 5/1955 | Kramcsak | 16—35 |
| 2,709,828 | 6/1955 | Noelting et al. | 16—35 |
| 3,066,764 | 12/1962 | Clinton et al. | 16—35 |
| 3,239,873 | 3/1966 | Fisher | 16—35 |

BOBBY R. GAY, *Primary Examiner.*

DORIS L. TROUTMAN, *Assistant Examiner.*